United States Patent Office 2,709,380
Patented May 31, 1955

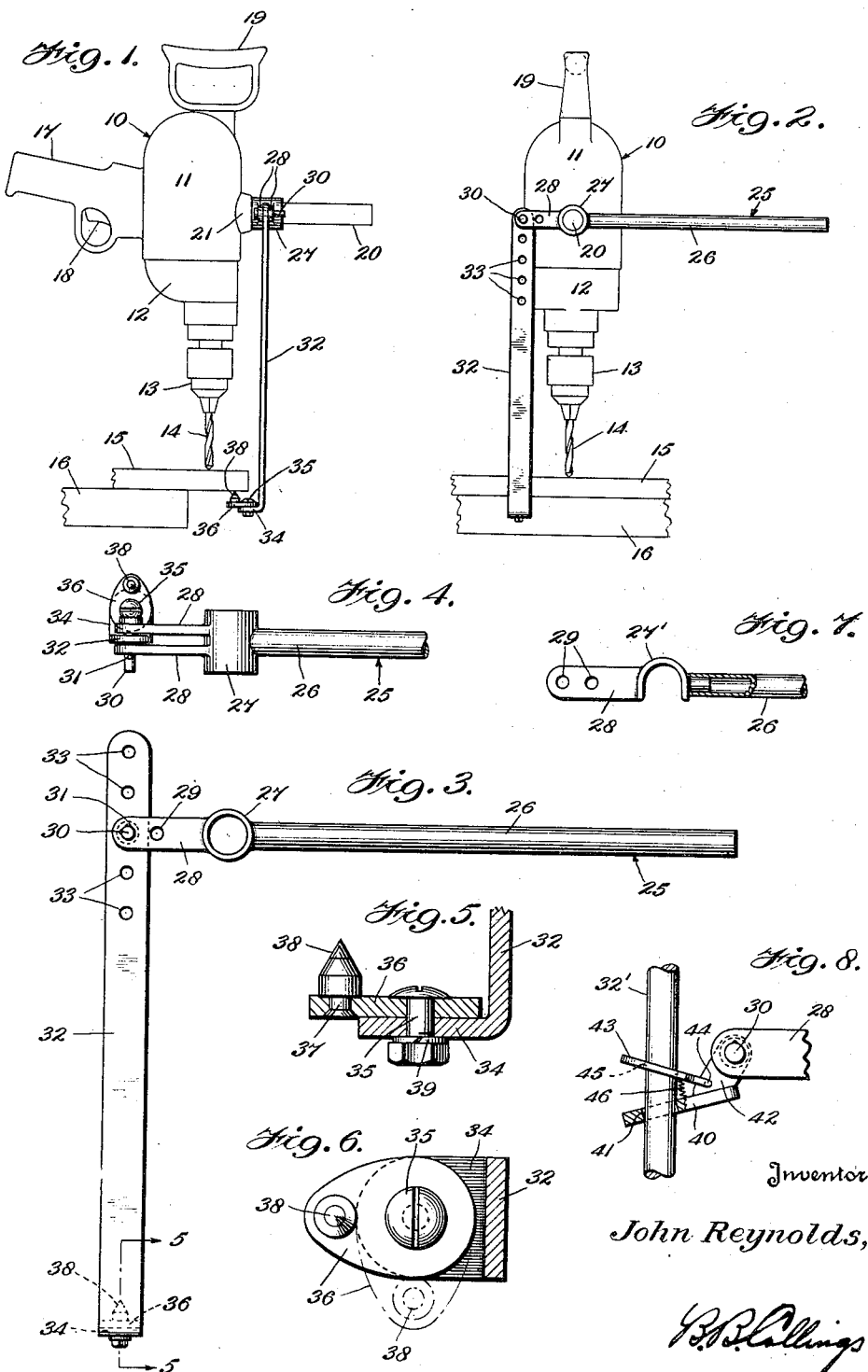

2,709,380

FEED ATTACHMENT FOR PORTABLE POWER-DRIVEN DRILLS

John Reynolds, Lakewood, N. J.

Application August 28, 1950, Serial No. 181,869

1 Claim. (Cl. 77—7)

The invention relates to an attachment for portable power-driven drills, and has for its principal object the provision of a comparatively simple device which is readily applicable to a widely used form of electrically driven hand drill, whereby to facilitate the manipulation thereof during a drilling operation, and more especially the application of the pressure necessary to feed the drill to the work.

For purposes of disclosure of the invention, a typical example of the device has been illustrated in the accompanying drawing forming a part of this specification, in which like reference characters designate like parts in all the views, and in which:

Figure 1 is a side elevational view of a conventional electrically driven hand drill, with one form of attachment constructed and arranged in accordance with the invention operatively associated therewith;

Fig. 2 is a front elevational view of the parts shown in Fig. 1, as seen from the right thereof;

Fig. 3 is an enlarged elevational view of the device per se;

Fig. 4 is a partial top plan view of the parts shown in Fig. 3;

Fig. 5 is an enlarged vertical sectional view on the plane indicated by the line 5—5 in Fig. 3, looking in the direction of the arrows;

Fig. 6 is a plan view of the parts shown in Fig. 5; and

Figs. 7 and 8 are fragmentary elevational views illustrating slight modifications in details of the construction.

Referring to the said drawing in greater detail, there is shown in Figs. 1 and 2 a well known form of electric hand drill 10 to which the attachment is particularly applicable, such drill comprising a motor 11, appropriate speed reduction gearing enclosed by an extension 12 of the motor housing and driven from the motor shaft, and a chuck 13 carried by the output shaft of the said gearing and adapted to hold a twist drill or other cutting tool 14 which is to produce an aperture or recess in a work-piece 15 supported on a work bench or other support 16. The drill is provided with a "pistol grip" 17 extending from one side of the housing of the motor 11, which grip houses a trigger 18 that actuates a switch for controlling the supply of current to the motor. The motor housing also carries an end hand grip 19 for facilitating manipulation of the tool under certain conditions; and in many instances there is also an auxiliary or steadying pin or handle 20 projecting from the side of the motor housing opposite the pistol grip 17. This pin, which may be either solid or tubular, is threaded or otherwise removably secured in a boss 21 of the motor housing.

The device constituting the present invention is adapted to be readily removably attached to the conventional drill structure just described, through the medium of the said pin 20. It comprises a lever 25 composed of a rod or tube 26 having a bearing sleeve or eye 27 welded or otherwise rigidly secured to one of its ends, and a pair of transversely spaced arms 28 secured to and extending from the side of the sleeve opposite that to which the tube 26 is attached. As will be understood from Figs. 1 and 2, the eye or sleeve 27 is slidably and rotatably receivable on the pin 20 of the drill 10, whereby the lever may be easily mounted on and removed from the pin, and when in position may be oscillated thereon.

The arms 28 are provided with one or more pairs of alined holes 29 for the reception of a headed pin 30 having a spring-pressed ball detent 31 for preventing its unintentional displacement from said holes. The said pin pivotally mounts one end of an anchor bar 32 disposed between the arms 28, which bar is provided with a plurality of holes 33 for alternative reception of the pin whereby the effective length of the bar may be altered as necessary or desirable to accommodate drills of different lengths and/or work-pieces of varying thicknesses. The other end of the bar 32 is provided with an angularly disposed extension or foot 34 to which is pivotally secured, as by a bolt 35, a swingable toe 36 the outer end of which carries a stud 37 having a conical head 38.

The manner of using the appliance will be clear from Figs. 1 and 2. The eye 27 of the lever 25 having been slipped onto the pin 20 of the drill 10, and the effective length of the bar 32 having been adjusted according to the length of the drill and/or the thickness of the work-piece 15 by insertion of the pin 30 in the proper hole 33 of the said bar, the drill is then disposed substantially as shown, with the cutting element 14 engaging the work-piece at the point at which it is desired to produce the hole or recess. The bar 32 is then positioned to bring the point of the conical head 38 of the stud 37 into anti-slipping engagement with the rear face of the work-piece or the support such as 16 upon which the piece rests, whereupon, with one hand grasping the pistol grip 17 to support and steady the drill and manipulate the trigger 18 to control actuation of the motor 11, the handle 26 of the lever 25 may be grasped with the other hand and a downward pressure exerted thereon to feed the cutting element 14 to the work as rapidly as conditions require or permit. During this action the pin 30 provides a fulcrum for the lever 25, and the foot or extension 34 of the bar 32, together with the parts associated therewith, serve to anchor said bar and take the upward thrust imposed thereon by the lever movement.

By relieving the pressure upon the lever handle 26 as the point of the cutting element 14 breaks through the rear face of the work-piece 15, much breakage of the cutting elements, which frequently occurs at this point in the operation, may be avoided.

It sometimes happens that the shape or position of the work-piece is such that it is not feasible to secure the desired engagement of the point of the conical stud head 38 with the rear face of the piece when the toe 36 is positioned as shown in Figs. 1 and 4. In such cases, by swinging the toe to an angular position, such for example as shown in broken lines in Fig. 6, it is possible to obtain the required contact. A spring washer 39 provides sufficient friction between the engaging faces of the extension 34 and toe 36 to retain the latter in any set position.

Obviously, it is not essential that the bearing element 27 of the lever 25 be disposed in abutting relation to the boss 21 of the motor housing 11 as shown in Fig. 1. It may be positioned substantially anywhere along the length of the pin 20, and thus the drill may be positioned to produce holes or recesses at varying distances from the edge of the work-piece 15, as may be required. In this connection it may also be noted that the bearing member of the lever need not necessarily be a circular sleeve or eye, but may take the form of a semi-circular or U-shaped element as shown at 27' in Fig. 7, which may be engaged with the pin 20 of the drill by a movement transverse to the pin axis instead of by the axial sliding movement required by the sleeve 27.

Other forms of adjustable connection between the lever 25 and the bar 32 may be employed in lieu of the pin 30 and series of holes 33 shown in Figs. 2 and 4. For example, in Fig. 8 the bar takes the form of a round rod 32' upon which is mounted a cramping connector comprising a base plate 40 having an aperture 41 of a size to freely slidably receive said rod, and an apertured ear 42 for receiving the pin 30 to pivotally connect the lever arms 28 thereto. A locking plate 43 is pivotally attached to the ear 42 at 44 and is provided with an aperture 45 similar to the aperture 41 of the base plate 40. A spring 46 is interposed between the plates and urges them apart to an angular relationship relative to each other and to the rod 32', whereby the edges of the apertures 41 and 45 crampingly engage the surface of the said rod and prevent sliding of the device thereon. By squeezing the plates 40 and 43 together against the action of the spring 46, the cramping action is relieved and the connector may be adjusted along the rod to any desired position, whereupon release of the plates will again lock the device to the rod.

Since this type of connector permits of the rod 32' being rotated about its axis relative to the lever 25 and the angular foot or extension at the lower end of the rod thus disposed at different angles thereby attaining the same result as by swinging the toe 36, the latter element may be dispensed with in this form of the appliance, and the pointed stud 37 mounted directly on the said extension.

While the attachment has been illustrated in use with the drill 10 positioned for vertical drilling, it is by no means limited thereto, and may be employed with the drill disposed in substantially any position.

What is claimed is:

In drilling apparatus, the combination with a portable motor driven hand drill having a cylindrical auxiliary steadying handle projecting laterally from one side thereof, of a drill feeding device comprising a hand lever having a bearing portion intermediate its ends unrestrainedly slidably and rotatably mounted on said steadying handle; and a bar member pivotally carried and solely supported by said lever adjacent the drill, said bar member having a laterally projecting portion disposable behind and engageable with a work piece to anchor said member and take the thrust imposed thereon by a swinging movement of the lever, whereby the drill may be fed toward the work piece.

References Cited in the file of this patent

UNITED STATES PATENTS

| Re. 15,864 | Grau | June 24, 1924 |
| 1,131,777 | Gage | Mar. 16, 1915 |
| 1,533,381 | Burton | Apr. 14, 1925 |
| 1,778,579 | Bartel | Oct. 14, 1930 |
| 2,472,270 | Stinchcomb | June 7, 1949 |